Nov. 19, 1940.   O. F. CARLSON   2,221,942
PRESSURE REDUCING FEED VALVE
Filed Sept. 9, 1939   2 Sheets-Sheet 1

INVENTOR.
Oscar F. Carlson
BY
ATTORNEYS.

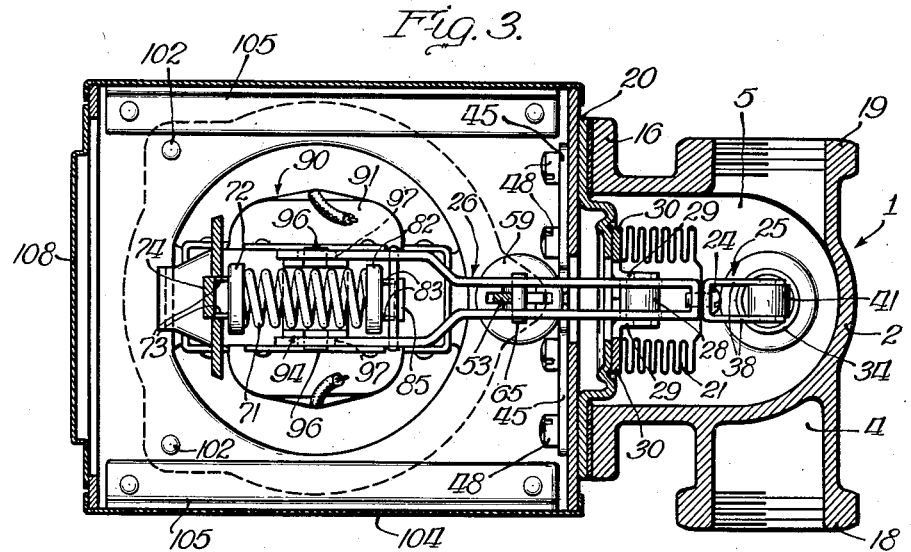
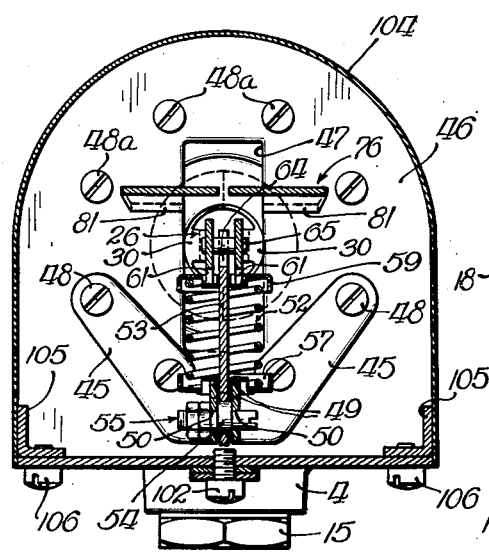
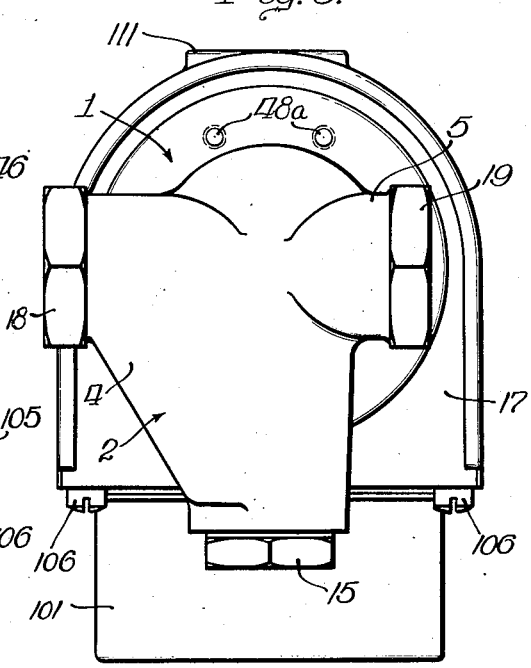
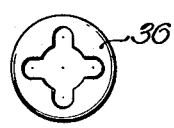

Patented Nov. 19, 1940

2,221,942

UNITED STATES PATENT OFFICE 2,221,942

PRESSURE REDUCING FEED VALVE

Oscar F. Carlson, Kenilworth, Ill., assignor of one-half to Oscar F. Carlson Company, Chicago, Ill., a corporation of Illinois, and one-half to Everett N. McDonnell, Chicago, Ill.

Application September 9, 1939, Serial No. 294,051

12 Claims. (Cl. 137—139)

The present invention relates generally to improvements in controlling apparatus for hot water boilers and the like, and more particularly to means for maintaining a substantially constant head, or pressure, in the boiler.

The object and general nature of this invention is the provision of a pressure reducing feed valve constructed and arranged to control the admission of water from a suitable source, such as a city water system, to a boiler or other means of utilization, whereby to maintain a constant head of water. More specifically, it is a feature of the present invention to provide a flow controlling valve which is held closed by spring means constructed to counterbalance the pressure of the city water system acting against the valve, in connection with an electromagnet adapted, when energized, to open the valve whenever the pressure, or head, at the discharge side of the valve reaches a predetermined minimum, the valve being held open and admitting additional water from the city water system until the pressure is built up to a predetermined point, whereupon the valve is automatically closed.

It is a further feature of this invention to provide a flow controlling valve opened and closed by a pivoted lever which is arranged to have longitudinal movement, the valve being connected to the lever whereby pivotal movement of the latter operates the valve and the lever being connected with the valve housing by sealing means which accommodates movement of the lever relative to the housing and, in addition, acts as pressure responsive means whereby the lever may move longitudinally in response to pressure changes in the outlet chamber. It is also a feature of this invention to provide two spring means, one tensioned to counterbalance the inlet pressure acting against the valve and the other being tensioned to counterbalance the head or pressure in the outlet chamber. Still further, it is a feature of this invention to provide switch means actuated by longitudinal movement of the valve lever for controlling the electromagnet that is connected to swing the lever about its pivotal support, thereby moving the valve from one position to the other.

An additional feature of the present invention resides in the provision of spring means which not only counterbalances the pressure or head in the outlet chamber of the valve housing but, moreover, is so positioned angularly as to hold the valve in one position or the other, whereby the movement of the valve occurs with a snap action, thereby providing a definite open and a definite closed position and eliminating any tendency to chatter.

The pressure reducing valve of the present invention has a fairly large differential, due to angular arrangement of the springs therein and the long travel of the switch operating lever arm, and therefore is particularly adapted for use in a closed automatic hot water heating system. It has been the practice in such heating systems to employ a constant pressure reducing valve, set, for example, at 15 lbs. per square inch, between the boiler and the city water main or other source of supply. It frequently will be found that the pressure in a city water main will range from 65 to 150 lbs. per square inch and it will be apparent that with a constant pressure reducing valve set at 15 lbs. pressure per square inch for a certain supply pressure in the city water main, the reduced pressure in the heating system will vary, up or down, in proportion to changes of pressure in the source of supply, while the pressure reducing valve will try to maintain, by a wire drawing feed, the 15 lbs. per square inch constant pressure.

The pressure reducing valve of the present invention avoids the above noted objections and operates satisfactorily over a wide range of pressures present in the source of supply, to open, for example, to admit water to the boiler when the pressure therein drops to 10 lbs. per square inch, and to close when pressure in the system rises to 15 lbs. per square inch. When a heating cycle is started by the automatic burner, expansion of the water takes place. A pressure relief valve is employed, set to open, for example, when the pressure rises to 30 lbs. per square inch and to close when the pressure has dropped to approximately 25 lbs. per square inch.

It will thus be seen that by employing the differential pressure reducing feed valve of my invention, together with a pressure relief valve, in a closed automatic hot water heating system, provision is made for expansion and contraction with a minimum amount of wasted water.

These and other objects and advantages of the present invention will be apparent to those skilled in the art after a consideration of the following detailed description, taken in conjunction with the accompanying drawings.

In the drawings:

Figure 3 is a sectional view, taken generally along the line 3—3 of Figure 1;

Figure 4 is a vertical transverse section, taken generally along the line 4—4 of Figure 1;

Figure 5 is an end view of the valve housing;

Figure 6 is an enlarged detail view of the closing spring washer; and

Figure 7 is an enlarged detail view of one of the two valve guides.

Figures 1, 2:
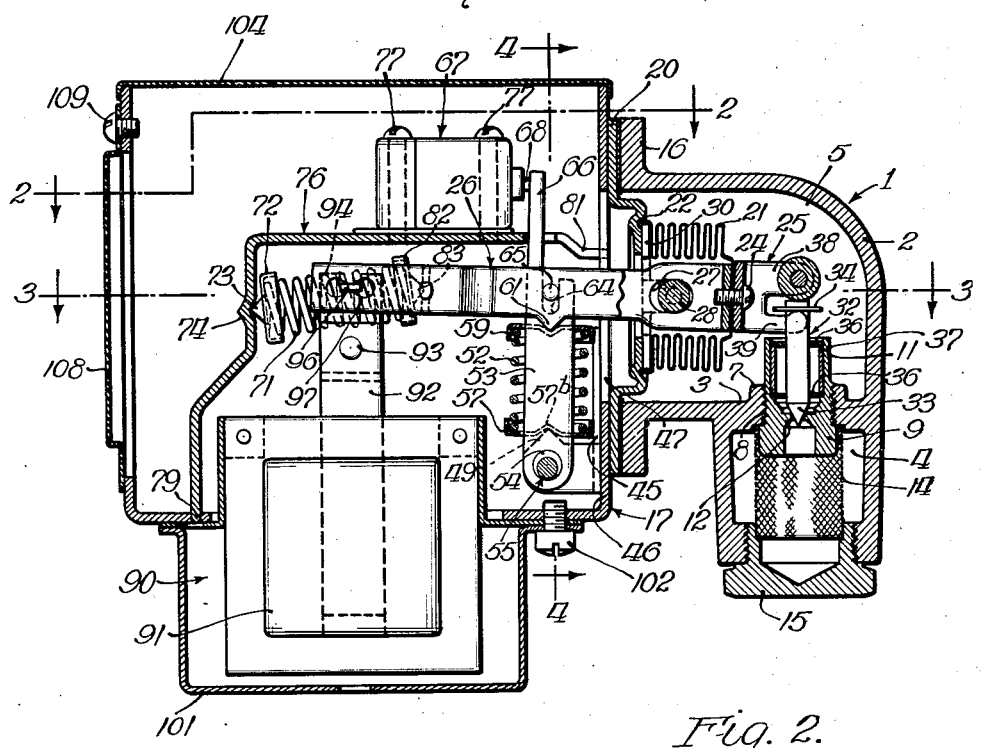
Figure 1 is a longitudinal vertical section taken through a pressure reducing feed valve constructed according to the principles of this invention.
Figure 2 is a sectional view, taken generally along the line 2—2 of Figure 1, showing the support for the switch.

Referring now more particularly to Figure 1, the reference numeral 1 indicates, in its entirety, the valve unit which comprises a body or housing 2 which is divided by a wall 3 into an inlet chamber 4 and an outlet chamber 5. The wall 3 is provided with a boss 7 which is apertured and threaded as at 8, to receive a valve seat 9. The latter has an extended cylindrical end 11 and a valve seat proper, as indicated at 12. The latter is in the form of a shoulder and is preferably formed of brass, but may be made of any other suitable material. A strainer 14 is seated between the lower face of the wall 3 and the upper face of a screw-threaded strainer cap 15. The strainer 14 surrounds the head end of the valve seat 9. By unscrewing the part 15, the strainer 14 may conveniently be removed or replaced when required, as for cleaning or the like. The valve body 2 has an attaching flange 16 by which it may be secured to a lever and solenoid housing 17, as will be referred to later. The valve body 2 is flanged and threaded, as at 18 and 19, to receive inlet and outlet connections of any suitable kind.

The outlet chamber 5 is closed at the end having the flange 16 by a plate 20 which serves as a base for a sealing and extensible bellows 21. One end of the bellows 21 is sealed, as by soldering or the like, as at 22, to the base plate 20 in leak-tight relation. The other end of the bellows 21 is closed except for a small opening through which a screw 24 extends. The screw 24 serves to fix a valve operating arm 25 to an arm 26 which, as best shown in Figure 3, comprises a U-shaped member having slots 27 by which the arm 26 is mounted for both pivotal and longitudinal movement on a roller 28 carried by apertured lugs 29 on a pair of half-rings 30 and extending into the interior portion of the bellows 21. Each part 30 carries one of the lugs 29 and is secured, as by riveting, to the base plate 20.

The two arms, 25 and 26, together constitute a lever which, while supported for both pivotal and longitudinal bodily movement by means exterior of the outlet chamber 5, extends into the latter in sealed and pressure responsive relation, and is operatively connected to open and close a valve controlling the flow from the inlet chamber 4 into the outlet chamber 5. As best shown in Figures 1 and 3, the valve, indicated in its entirety by the reference numeral 32, is of the needle type, including a stem having a conical valve closure end 33 at its inner end and a flange 34 at its outer end in the form of a washer or the like suitably secured to the valve stem. The valve 32 is mounted within the sleeve 11 of the valve seat 9 by means of a pair of upper and lower guide washers 36 (Fig. 7) spaced by a sleeve 37, hereby the valve 32 is constrained for axial movement toward and away from the valve seat shoulder 12. The valve operating arm 25, as best shown in Figures 1 and 3, is a generally U-shaped member having a pair of upper arms 38 and a pair of lower arms 39. The upper arms 38 rotatably receive a valve operating roller 41 which is adapted to engage the upper end of the valve 32, and the lower arms 39 are mounted and spaced to engage the flange washer 34. The screw 24 securely clamps the outer arm 25 to the arm 26, with the head of the sealing bellows 21 secured in leak-tight relation therebetween. By virtue of the two sets of arm sections 38 and 39, pivotal movement of the lever 25, 26 opens and closes the valve 32, but the longitudinal movement of the lever, as permitted by the slots 27, does not affect the position of the valve 32.

According to the present invention, the parts are so arranged that when the pressure within the chamber 5 is below a certain value, suitable spring means holds the sealing bellows 21 extended and the valve operating lever at its inward limit of movement. Switch mechanism is, by this movement, caused to energize a solenoid connected to the lever, and the energization of the solenoid acts through the lever itself to hold the valve 32 open until the pressure in the system to which the valve unit is attached exceeds the aforesaid predetermined value, whereupon the spring means yields and the consequent movement of the lever 25, 26 acts through the switch to deenergize the solenoid, which permits the valve to close under the influence of spring means suitably tensioned to close the valve against the pressure in the inlet chamber.

The mechanism for controlling the valve will now be described.

Disposed within the lever and solenoid housing 17 is a pair of brackets 45 riveted or otherwise secured to the wall 46 of the housing 17 on opposite sides of the opening 47 therein, through which the lever 25, 26 extends. Preferably, the brackets 45 are secured in place by bolts or cap screws 48 and these, with other bolts or cap screws 48a, are arranged to pass through the plate 20 and secure the housing 17 to the valve body flange 16. Each bracket 45 is provided with a knife edge 49 and an aperture 50. A closing spring 52 is disposed about a switch operating lever 53 the lower end of which is apertured and is rockably mounted on the eccentric portion 54 of an adjusting screw 55, supported in the openings 50 of the two brackets 45. The lower end of the closing spring seats against a washer 57 which is flanged to receive the spring and is apertured and notched at 57a and 57b (Figure 6) to receive the switch operating lever 53 and to rest against the knife edges 49 of the brackets 45. A similar washer 59 receives the upper end of the closing spring 52 and is likewise apertured and notched to receive the switch operating lever 53 which extends therethrough and knife edges 61 which are formed on the side portions of the lever arm 26. The switch operating lever 53 is slotted, as at 64, and receives a pin 65 carried by the arm 26, whereby the latter may have pivotal movement about the roller 28, but longitudinal movement of the lever 25, 26 will cause the switch operating arm 53 to swing about its pivotal support at 54, 55. The outer or upper end of the switch operating arm 53 is extended, as at 66, and is disposed in a position to actuate a switch unit, indicated in its entirety by the reference numeral 67, the switch unit including a plunger 68 which is moved when the operating arm 53 is swung about its pivotal support in one direction. It will be seen that the closing spring 52, pivotally anchored at its lower end and acting at its upper end against lever arm 26, will act through lever 25, 26 to hold the valve 32 closed. The spring 52 is constructed to be effective to hold the valve 32 closed against any pressure in the inlet chamber 4 that may be encountered in normal operation. It will also be observed that since the spring 52 acts at right angles against the lever 25, 26, the bias exerted by the spring 52 has no effect upon any longitudinal movement of the lever 25, 26.

A pressure spring 71 is disposed between the sides of the lever arm 26 at its outer end. At one end the spring bears against a washer 72 which is flanged to receive the spring and which is formed with a pair of points or knife edges 73 which seat in a notch 74 at one end of a generally L-shaped bracket 76 upon which the switch unit 67 is mounted, as by screws 77. One end of the bracket 76 is suitably secured, as at 79, to the solenoid housing 17, and the other end of the bracket 76 is provided with laterally spaced lugs 81 which are suitably secured to the wall 46 at opposite sides of the opening 47 therein. The other end of the pressure spring 71 seats in a flanged washer 82, which may be of the same construction as the washer 72 described above, the knife edges or points 83 of which are received by a bar 85 that is carried in fixed relation by the sides of the lever 26, as best shown in Figure 3.

It will be observed that the eccentric adjusting screw 55 provides an adjustment whereby the relation between the longitudinal movement of the lever 25, 26 and the point at which the switch unit 67 is actuated may be varied as desired. It will also be noted that the spring 71, which biases the lever 25, 26 for movement to the right as viewed in Figure 1, is arranged at a slight angle with respect to the longitudinal axis of the lever 25, 26 when the valve is closed. The pressure spring 71, therefore, exerts a small component of force working with the closing spring 52 to hold the valve 32 closed when the parts are disposed in the position shown in Figure 1.

The valve 32 is opened by means of an electromagnet indicated in its entirety by the reference numeral 90. The electromagnet 90 includes a solenoid 91 and an axially movable plunger 92 the upper end of which is secured, as at 93, to a generally U-shaped link member 94 the sides of which carry outwardly disposed lugs 96 which extend between upper and lower curved boss portions in each of two slots 97 formed in the outer ends of the lever arm 26, whereby axial movement of the solenoid plunger 92 swings the lever 25, 26 about its pivot 28. The switch unit 67 is connected by connectors (not shown) to the electromagnet 90 and to any suitable source of current whereby, when the circuit through the electromagnet 90 is completed, the plunger 92 is drawn within the solenoid and the valve is opened against the tension of the closing spring 52. In this connection, it will be noted that the spring 71 acts as a toggle, initially aiding the spring 52 in resisting the opening of the valve 32, but after the latter begins to open, the effect of the spring 71 decreases to the point where, after the pivots 28, 73 and 83 pass a straight line position, the spring 71 resists the closing of the valve 32 by the closing spring 52. Hence the valve 32 is opened and closed with a snap action, but this effect is secured without sacrificing any of the tension of the pressure spring 71 in acting through the lever arm 26 and the bellows 21 in resisting movement of the lever in response to pressure increases in the discharge or outlet chamber 5.

The electromagnet 90 is enclosed by a cover 101 fastened in place over the lower portion of the housing 17, as by cap screws 102. A housing cover 104 encloses the switch 67 and associated parts and comprises a generally U-shaped member having angles 105 (Fig. 4) welded or otherwise secured to the edges thereof. The angles 105 receive cap screws 106 which fasten the housing cover 104 in place. Clips may be used in place of the angles 105, if desired. The upper part of the housing 17 above the bracket 76 serves as a junction box, and is closed at one end by a removable cover 108 fastened in place by screws 109. The cover 104 has an outlet 111 for leads, as may be required.

The operation of the pressure reducing feed valve as described above is substantially as follows: When arranged to maintain a substantially constant head of water in a hot water heating plant, as for domestic residences or the like, the inlet chamber 4 is connected with the city water system in any suitable manner and the outlet chamber 5 is connected to the hot water heating plant. The latter may be incorporated in an entirely closed system, in which case there is usually provided a relief valve set to open at around 30 pounds pressure, or the present invention may be incorporated in an extension tank type of hot water system. Generally, the pressure in a city water system ranges from about 65 pounds per square inch to 150 pounds per square inch, and the spring 52 is designed to have sufficient power to maintain the valve 32 normally closed against the normal water pressure in the inlet chamber 4 which communicates directly with the city water system. The pressure spring 71 may be designed to respond to the pressure or head desired to be maintained in the heating plant. Usually, such pressures range from 5 pounds per square inch to 15 pounds per square inch, and if desired, any suitable kind of adjusting means, such as an adjusting screw, may be carried by the bracket 76 to receive the reaction of the spring 71. The latter, thus, acts through the lever arm 26 and the sealing bellows 21 to move the lever 25, 26 to the right (Figure 1) whenever the pressure in the outlet chamber 5 falls below the desired value, say 15 pounds per square inch. When this occurs, the movement of the lever 25, 26 acts through the switch operating lever 53 to permit the switch unit 67 to close, thereby completing a circuit through the electromagnet 90 which, thus energized, exerts sufficient pull on the plunger 92 to swing the lever 25, 26 in a counterclockwise direction (Figure 1) against the closing spring 52 and the pressure spring 71 to open the valve 32. The latter remains open until the pressure in the outlet chamber 5 rises to a point where the pressure exceeds that for which the device is adjusted, whereupon the pressure in the outlet chamber 5 acts through the bellows 21 to force the lever 25, 26 to the left (Figure 1) against the action of the pressure spring 71. This movement opens the switch unit 67, interrupting the circuit to the electromagnet, which is then deenergized and the closing spring 52 thereupon swings the lever 25, 26 in a clockwise direction and closes the valve 32. This is the position shown in Figure 1. The spring 71 acts as a toggle to provide a snap action movement of the lever 25, 26 when the valve 32 is opened by the electromagnet 90 and closed by the closing spring 52. The open position of the valve 32 may be defined by the pivot 82 engaging in the bottom of the slot 64, or by the plunger 92 seating in the bottom of the solenoid 91.

The switch unit 67 is preferably similar to that disclosed in the copending application of Elis F. Carlson, Serial No. 267,754, filed April 14, 1939, but it will be obvious, of course, that other forms of switch units may be utilized where desired. Preferably, however, the switch unit employed is one in which some form of snap action mechanism is provided in order to have some pressure differential between the open and closed circuit positions.

While I have shown and described above the preferred structure in which the principles of the present invention have been incorporated, it is to be understood that my invention is not to be limited to the specific means shown and described above but that, in fact, widely different means may be employed in the practice of the broader aspects of my invention.

What I claim, therefore, and desire to secure by Letters Patent, is:

1. A pressure responsive device comprising a valve, a part movable in one direction to operate the valve and movable in another direction in response to pressure on one side of said valve, and means actuated by movement of said part in said other direction for moving said part in said one direction to operate said valve.

2. In combination, a fluid chamber, a flexible pressure responsive member having one portion secured to one wall of the chamber, a lever connected with another portion of the flexible pressure responsive member and mounted for movement in two directions generally normal to each other, one movement being in response to changes in pressure in the chamber, and an inlet valve for the chamber controlled by the other movement of the lever, a switch operated by the pressure responsive movement of the lever, and electrical means controlled by said switch for initiating the valve controlling movement of the lever.

3. In combination, a chamber having an inlet valve, a flexible pressure responsive bellows forming a wall and secured at one end to the chamber, a lever fixed to the other end of the bellows and supported for bodily shifting and pivotal movements, means connecting the inner end of said lever with said valve, mechanism outside said chamber for swinging said lever to open said valve, a spring connected with said lever to move the latter inwardly of said chamber when the pressure therein falls to a given value, and means outside said chamber and actuated by inward movement of the lever for actuating said mechanism.

4. In combination, a chamber communicating with a fluid containing system and a source of fluid under pressure, a flexible pressure responsive bellows forming one wall of said chamber, a valve controlling the flow of fluid from said source into said chamber, a lever sealed to the movable part of said bellows and connected at one end to said valve, mechanism connected with said lever for opening and closing the valve, and means responsive to the movement of said lever and bellows under changes of pressure in said chamber for actuating said mechanism.

5. A pressure responsive control device comprising a part mounted for both pivotal and longitudinal movement, means responsive to pressure within a fluid container for moving said part longitudinally, a valve controlling the flow of fluid into said container to increase the pressure therein, means connecting said part to said valve whereby pivotal movement of said part operates said valve, and means controlled by longitudinal movement of said part for swinging the latter pivotally to operate said valve.

6. A device for maintaining substantially constant pressure in a fluid container, comprising, in combination, a source of fluid normally at a higher pressure than the pressure in said container, a valve controlling the flow of fluid into said container, a part movable in one direction in response to the pressure in said container and connected with said valve whereby movement in another direction opens said valve, means for moving said part in said other direction for opening said valve, means biasing said part for movement in a direction opposite to said one direction when the pressure in said container falls to a given value, and means actuated by movement of said part in said opposite direction for causing said first means to open said valve.

7. A pressure control device comprising a valve body, inlet and outlet chambers therein, a valve controlling the flow therethrough and mounted to close against the pressure in said inlet chamber, a lever mounted for pivotal and longitudinal movement on a wall of the outlet chamber and connected at its inner end to said valve, a pressure responsive bellows accommodating both longitudinal and pivotal movement and sealing said lever to said wall, a loading spring connected with said lever to resist longitudinal movement thereof due to the pressure in said outlet chamber, a second spring connected to said lever and arranged to close the valve against the pressure in the inlet chamber by swinging said lever about its pivot, a solenoid for overcoming said second spring and opening said valve, and switch means controlled by longitudinal movement of said lever and arranged to complete a circuit through said solenoid.

8. In combination, a valve body having inlet and outlet chambers and a valve seat therebetween, a valve adapted to close said valve seat against the inlet pressure, a lever extending into the inlet chamber and having a lost motion connection with said valve whereby pivotal movement of said lever opens and closes said valve and said lever is capable of moving longitudinally without moving the valve, a bellows sealing said lever to the outlet chamber whereby pressure therein tends to move said lever longitudinally, means tending to resist said movement of the lever, a switch operated by movement of said lever in one direction longitudinally, and an electromagnet controlled by said switch for swinging said lever to open said valve when said lever is moved longitudinally by said biasing means in response to a lowered pressure in said outlet chamber.

9. A pressure reducing feed valve comprising a valve body having inlet and outlet chambers, a valve seat therebetween and a valve closure in said outlet chamber controlling the flow through said seat, a lever mounted for both longitudinal and pivotal movement and extending into said outlet chamber, means connecting the inner end of said lever to said valve closure for moving the same toward and away from said seat in response to pivotal movement of said lever, a bellows responsive to the pressure in said outlet chamber and sealing said lever to said valve body, spring means acting against said lever to hold the valve closure against said seat and to hold said lever and bellows against movement due to the pressure in said outlet chamber, an electromagnet connected with the outer end of said lever, and switch means actuated by the longitudinal movement of said lever when the pressure in said outlet chamber is reduced for energizing said electromagnet and moving said valve closure away from said valve seat.

10. A pressure reducing feed valve comprising a valve body having inlet and outlet chambers, a valve therein controlling the flow from the inlet chamber to the outlet chamber, a lever operatively connected to control said valve and mounted for both pivotal and longitudinal movement, a portion of said lever being disposed in said outlet chamber, a pressure responsive bellows sealing said portion of the lever in said outlet chamber, a first spring member connected to act against said lever to restrain pivotal movement thereof and tensioned to substantially counterbalance the pressure in said inlet chamber acting against said valve, a second spring extending generally coaxially with respect to said lever, said second spring being anchored at one end and acting at the other end against said lever so as to counterbalance the pressure in said outlet chamber acting against said sealing means, said second spring serving as snap action means tending to hold said valve in either its closed or open position.

11. A pressure reducing feed valve as defined in claim 10, further characterized by an electromagnet for operating said lever, a switch for controlling said electromagnet, and a part connected with said lever and moved when the latter is shifted longitudinally in response to pressure changes in the outlet chamber for actuating said switch.

12. A pressure reducing feed valve as defined in claim 10, further characterized by an electromagnet connected with said lever for swinging the same about its pivotal mounting to open and close said valve, a switch unit for actuating said electromagnet, a second lever pivoted at one end and having a slotted connection with said first lever, whereby longitudinal movement of the latter swings said second lever about its pivotal support but swinging movement of said first lever does not effect movement of the second lever, and means whereby swinging movement of said second lever operates said switch unit.

OSCAR F. CARLSON.